US010938195B2

(12) United States Patent
Kegel et al.

(10) Patent No.: US 10,938,195 B2
(45) Date of Patent: Mar. 2, 2021

(54) CABLE DRUM FOR SUPPLYING ENERGY TO AN ELECTRICALLY OPERATED UTILITY VEHICLE

(71) Applicant: Deere & Company, Moline, IL (US)

(72) Inventors: Volker Kegel, Mannheim (DE); Nicolai Tarasinski, Frankenthal (DE); Julian Daubermann, Mannheim (DE); Philipp Lehmann, Homburg (DE); Simon Pfaffmann, Kaiserslautern (DE)

(73) Assignee: DEERE & COMPANY, Moline, IL (US)

( * ) Notice: Subject to any disclaimer, the term of this patent is extended or adjusted under 35 U.S.C. 154(b) by 269 days.

(21) Appl. No.: 16/106,410

(22) Filed: Aug. 21, 2018

(65) Prior Publication Data

US 2019/0074678 A1     Mar. 7, 2019

(30) Foreign Application Priority Data

Sep. 7, 2017  (DE) ..................... 10 2017 215 822.0

(51) Int. Cl.
| H02G 11/02 | (2006.01) |
| H02G 3/03 | (2006.01) |
| B65H 54/28 | (2006.01) |
| B65H 75/42 | (2006.01) |

(52) U.S. Cl.
CPC ......... *H02G 11/02* (2013.01); *B65H 54/2854* (2013.01); *B65H 75/425* (2013.01); *H02G 3/03* (2013.01); *B65H 2701/34* (2013.01); *B65H 2701/528* (2013.01)

(58) Field of Classification Search
CPC ................................ H02G 11/00; H02G 11/02
See application file for complete search history.

(56) References Cited

U.S. PATENT DOCUMENTS

| 2,330,086 A | 9/1943 | Soffner |
| 3,815,842 A * | 6/1974 | Scrogin ............... B65H 49/305 |
| | | 242/423.1 |
| 3,989,200 A | 11/1976 | Bachi |
| 4,484,712 A | 11/1984 | Leenders |

(Continued)

FOREIGN PATENT DOCUMENTS

| DE | 850130 C | 9/1952 |
| DE | 2628812 A1 * | 1/1977 ............. B65H 75/02 |

(Continued)

OTHER PUBLICATIONS

German Search Report issued in counterpart application No. 102017215822.0 dated Mar. 21, 2018. (12 pages).

(Continued)

*Primary Examiner* — Robert J McCarry, Jr.

(57) ABSTRACT

A cable drum for supplying energy to an electrically operated utility vehicle includes an axially extending winding body, a winding drive for rotatably driving the winding body for reeling-up or unreeling an electric line, a spacing means for segmenting a winding layer reeled-up onto the winding body, and an air conveying means for generating cooling air through a passage region. The cooling air flows outward of the interior of the winding body. The passage region is kept clear between adjacent segments of the winding layer.

19 Claims, 3 Drawing Sheets

(56) References Cited

U.S. PATENT DOCUMENTS

| | | | |
|---|---|---|---|
| 7,309,834 B1 * | 12/2007 | Byrd .................... | B65H 75/425 |
| | | | 174/135 |
| 8,763,944 B2 * | 7/2014 | Dorosko ................ | H02G 11/02 |
| | | | 242/388.5 |
| 2009/0127047 A1 * | 5/2009 | Simon .................... | H02G 11/02 |
| | | | 191/12.2 R |
| 2017/0151879 A1 * | 6/2017 | Guillermin .......... | B65H 75/425 |

FOREIGN PATENT DOCUMENTS

| | | |
|---|---|---|
| DE | 2628812 A1 | 1/1977 |
| DE | 102004020448 A1 | 12/2004 |
| JP | S62260512 A | 11/1987 |
| JP | 2001031332 A | 2/2001 |

OTHER PUBLICATIONS

European Search Report issued in counterpart European Patent Application No. 18192436.6 dated Nov. 15, 2019 (11 pages).
European Search Report issued in counterpart application No. 18192436.6 dated Jan. 2, 2019. (8 pages).

* cited by examiner

CABLE DRUM FOR SUPPLYING ENERGY TO AN ELECTRICALLY OPERATED UTILITY VEHICLE

RELATED APPLICATIONS

This application claims priority to German Patent Application Ser. No. 102017215822.0, filed Sep. 7, 2017, the disclosure of which is hereby incorporated by reference in its entirety.

FIELD OF THE DISCLOSURE

The present disclosure relates to a cable drum for supplying energy to an electrically operated utility vehicle and which can be put into rotation by means of a winding drive for the purpose of reeling-up or unreeling an electric line.

BACKGROUND

A cable drum having a motor-driven winding cylinder is disclosed, for example, by DE 10 2004 020 448 A1. The winding cylinder has a multiplicity of air passage openings for applying a cooling air flow to an electric cable wound thereon. It is disadvantageous that the passage of the air flow between the individual cable windings becomes increasingly impeded as the number of mutually superimposed winding layers increases.

Thus, there is a need for a cable drum with an improved cooling capacity.

SUMMARY

In a first embodiment of the present disclosure, a cable drum for supplying energy to an electrically operated utility vehicle comprises an axially extending winding body, which can be put into rotation by means of a winding drive for the purpose of reeling-up or unreeling an electric line. Furthermore, spacing means are provided for segmenting a winding layer reeled-up onto the winding body in such a manner that a passage region, through which cooling air generated by means of an air conveying means, flows outward of the interior of the winding body, is kept clear between adjacent segments of the winding layer.

In this way it is ensured that, irrespective of the number of mutually superimposed winding layers, cooling air flows uniformly around the line windings directly adjoining the passage region. Each of the segments typically comprises 1 to 6 line windings per winding layer, such that the distance to the outer line windings exposed to the cooling air flow is at most ½ to 3 line widths in each case. Even in the case of a multiplicity of mutually superimposed winding layers, in this case there is an adequate dissipation of heat out of the interior of the winding packets present in the segments.

An application of the cable drum according to this disclosure presents itself, in particular, in connection with electrically operated utility vehicles, owing to the high power densities that are to be expected. The cable drum may be, for example, a constituent part of an autonomously driving agricultural tractor, the travel or work assemblies of which are driven by means of electric motors operating in the medium voltage range. The cable drum, or the winding body, may be dimensioned in such a manner that an electric line having a length of several kilometers can be accommodated thereon. The electric line in this case, in addition to comprising cores for electric power supply, may also comprise such for electrical or optical data transmission.

The spacing means are spacing rods projecting radially on the winding body. The spacing rods, in particular composed of steel or high-strength plastic, may be uniformly spaced apart from each other axially, and arranged in rows along the axial course of the winding body. In variation from this, however, a mutually offset arrangement may be provided, which takes account of the course, or lay, of the line windings around the winding body and, upon rotation of the winding body, promotes reeling-up and unreeling of the electric line that is collision-free in respect of the spacing rods.

In each of the passage regions, a plurality of spacing rods may be arranged in an evenly distributed manner along an outer circumference of the winding body. The diameter of the spacing rods in this case defines the width of the passage region kept free on the winding body for the cooling air flow. In particular, the passage region is in the form of a circumferential annular gap, for which purpose the spacing rods each lie in a common section plane of the winding body.

It is also possible that an even number of spacing rods is provided in each of the passage regions, the spacing rods being able to be connected to each other radially in pairs in an end region in each case to increase the stability. In this case, each of the pairs has a u-shaped or v-shaped course of the spacing rods in relation to each other.

In order to reduce the possibility of damage to the electric line during rolling-up and unrolling, the spacing rods may additionally be attached to the winding body in a radially flexible, in particular elastic, manner. In this case, these may be bending parts composed of spring steel, which are each designed as torsion springs in the region of an attaching point assigned to the winding body. Alternatively, the spacing rods have flexible material properties, for which purpose they are composed of elastic steel or plastic.

For the purpose of protecting the electric line, the spacing rods may additionally have rounded edges. It is also possible for the latter to be provided with a friction-reducing coating composed of plastic, thus ensuring that, within the respective segment, the individual line windings slide past along the spacing rods in an improved manner during rolling-up and unrolling.

During reeling-up and unreeling, the electric line may also be guided, by means of a cable guide, in a predefined direction of incidence relative to the winding body, the spacing rods having an angle of inclination relative to the winding body, that corresponds to the predefined direction of incidence. It can thereby be ensured that during rotation of the winding body, the spacing rods run substantially parallel to each other in passing the region of the electric line. In this way, unwanted crossing or collision of the electric line with the spacing rods during rotation of the winding body is largely avoided. Also conceivable, in addition, is a course of the spacing rods bent in the form of a spiral, which takes account of the fact that the direction of incidence of the electric cable changes as the number of mutually superimposed winding layers increases.

The winding body may have first and second drum flanges at its axial end faces, an air supply opening, which communicates with the air conveying means, being realized in at least one of the two drum flanges. The air conveying means may directly adjoin the air supply opening, and be attached to the respective drum flange by means of corresponding fastening elements. In one embodiment, the air conveying means is an electrically driven ventilating fan such as, for example, a radial fan.

The winding body per se may be formed either by a drum skeleton or a closed drum body having air outlet openings provided in the passage regions. In the case of use of a drum skeleton, the line windings of the winding layer that are mutually superimposed within the segments limit the cooling air flow to the passage regions kept free by means of the spacing rods, such that the back-pressure built up within the winding body by means of the air conveying means can substantially escape outward only via these regions. The drum skeleton is usually composed of a multiplicity of axial struts, arranged parallel to each other along a notional drum circumference, which are stiffened by means of a plurality of transversely extending radial rings. On the other hand, the closed drum body has a drum-shaped wall composed of steel plate, in which the air outlet openings are made in the form of corresponding through-holes.

Furthermore, the cable drum may comprise a cable guide, which is axially displaceable by means of a positioning means, for reeling-up and unreeling the electric line, a control unit controlling the winding drive in combination with the positioning means in such a manner that, by coordination of the rotation of the winding body with the axial displacement of the cable guide, the electric line is reeled-up orthocyclically onto the winding body. For this purpose, there may be a rotary position transducer assigned to the winding body and a position sensor assigned to the displaceable cable guide, the sensor information provided to that extent being supplied to the control unit for evaluation and corresponding control of the winding drive and to the positioning means. The positioning means includes, in particular, a lateral guide block that is mounted inside the guide rail and to which the actual cable guide is fastened. The lateral guide block is movable back and forth inside the guide rail by means of an electric spindle drive. During reeling-up and unreeling of the electric line, the orthocyclic winding pattern in this case may provide an orthogonal jump, i.e., oriented transversely in relation to the winding direction, by an entire line width, or half a line width, and specifically in each case upon completion of a full or half rotation of the winding body. The orthogonal jump in this case allows a change between adjacent segments without possible collisions with the respective spacing rods. The maintenance of a fixedly predefined winding pattern additionally allows a particular stock of line to be accommodated in a reproducible manner on the cable drum, since winding errors resulting in a corresponding space requirement, such as, for example, line windings that are mutually superimposed in a disorderly manner and the like, are avoided in advance.

The cable guide may have a sensor means for sensing a lateral deviation of the electric line from a winding direction to be maintained, the control unit, upon identification of an inadmissible lateral deviation, initiating a correcting movement of the cable guide by controlling the positioning means or partially reeling back the electric line by controlling the electric winding drive in order to remedy a mis-winding. Typically, an inadmissible deviation from the winding direction to be maintained exists if the lateral exit angle of the electric line at the lateral guide block deviates from the perpendicular to the winding body by a predefined tolerance dimension. For the purpose of sensing the lateral exit angle, i.e., the angle assumed by the electric line within the plane spanned by the rotary shaft of the winding body, the sensor means may have a laser scanner, a light barrier or a camera, allowing contactless scanning of the electric line, or more precisely of the portion of line emerging at the lateral guide block in the direction of the winding body. In variation from this, sensing by means of a mechanical angle sensor is also possible. For this purpose, the angle sensor has a touch probe bearing against the electric line, in order to sense the course of the line.

In addition, it is possible for the air conveying means to adapt the cooling air flow in dependence on information in respect of the operating temperature of the electric line present on the winding body. To that extent, closed-loop control of rotational speed can be effected by the control unit, for which purpose the latter performs an estimation of the actual cooling or volumetric flow requirement. The estimation of the actual cooling or volumetric flow requirement may be effected by the control unit on a model basis, according to electrical and thermal properties of the electric line used, such as the line resistivity, the thermal coefficient or the like, and also according to the wound state of the cable drum and the electric power carried by the electric line, the ambient temperature sensed by means of a temperature sensor additionally being included by the control unit.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
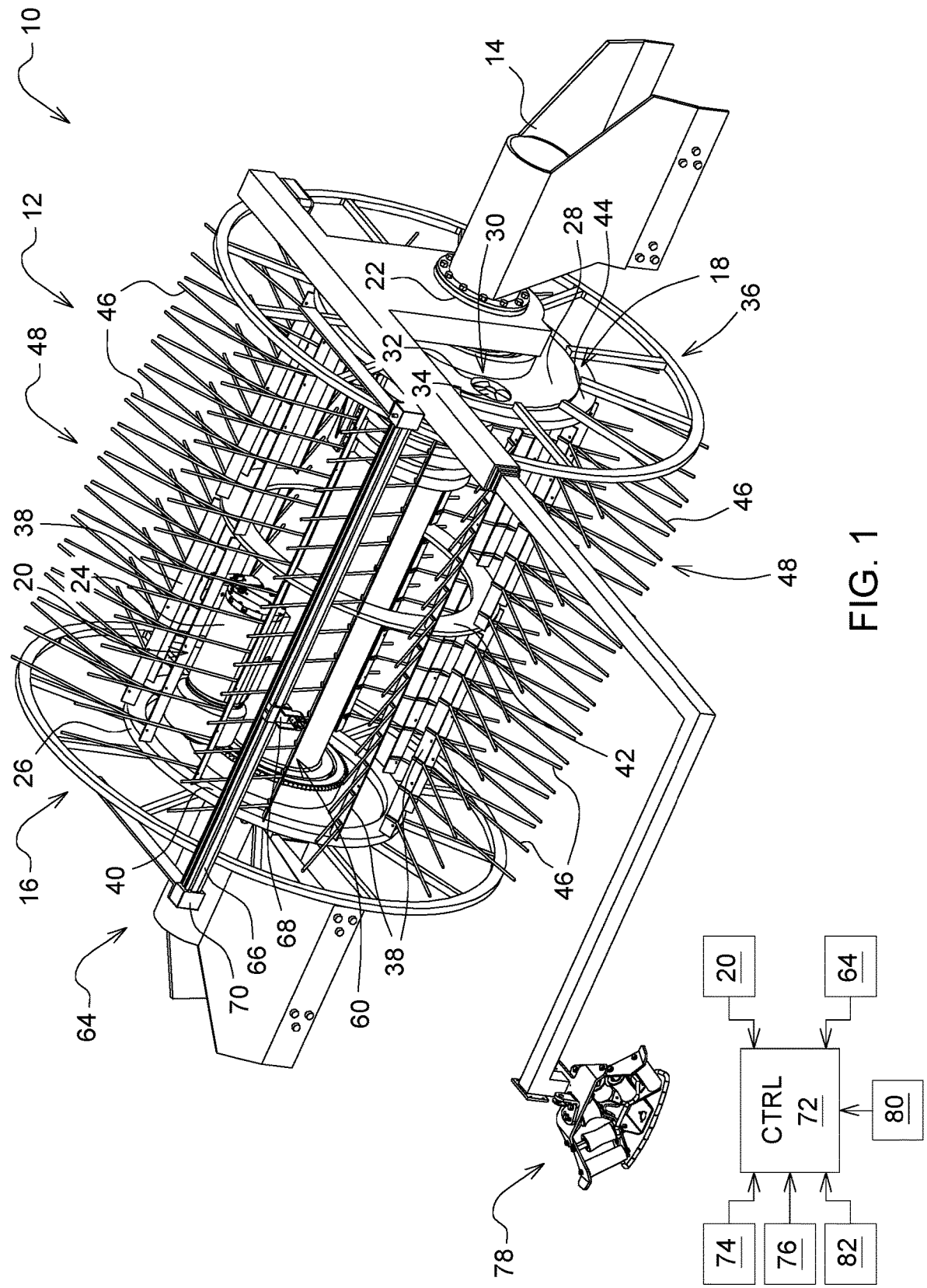
FIG. 1 is a schematic view of a cable drum in an unwound state.

FIG. 1 illustrates a first embodiment of a cable drum according to the present disclosure, in an empty state or unwound condition. The cable drum 10 has an axially extending winding body 12, which is rotatably mounted inside a supporting frame structure 14 at its axial end faces 16, 18, such that the winding body 12 can be put into rotation by means of an associated winding drive 20 for the purpose of reeling-up and unreeling an electric line, which are not represented in FIG. 1. In the present case, the winding drive 20 is an electric geared motor 24 that is connected to a rotary shaft 22 of the winding body 12.

The winding body 12, at its axial end faces 16, 18, furthermore has first and second drum flanges 26, 28 which form end winding delimitations for the reeled-up electric line. An air supply opening 32, which communicates with an interior air conveying means 30, is in the second drum flange 28. The air conveying means 30 directly adjoins the air supply opening 32, and is attached to the second drum flange 28 by means of corresponding fastening elements. The air conveying means 30 is an electrically driven ventilating fan 34 in the form of a radial fan.

According to this embodiment, the winding body 12 is formed by a drum skeleton 36. The drum skeleton 36 is composed of a multiplicity of axial struts 38, arranged parallel to each other along a notional drum circumference, which are stiffened by means of a plurality of transversely extending radial rings 40, 42, 44. The two outer radial rings 40, 44 in this case, together with the respective drum flange 26, 28, form end-face delimitations of the winding body 12.

Figure 2:
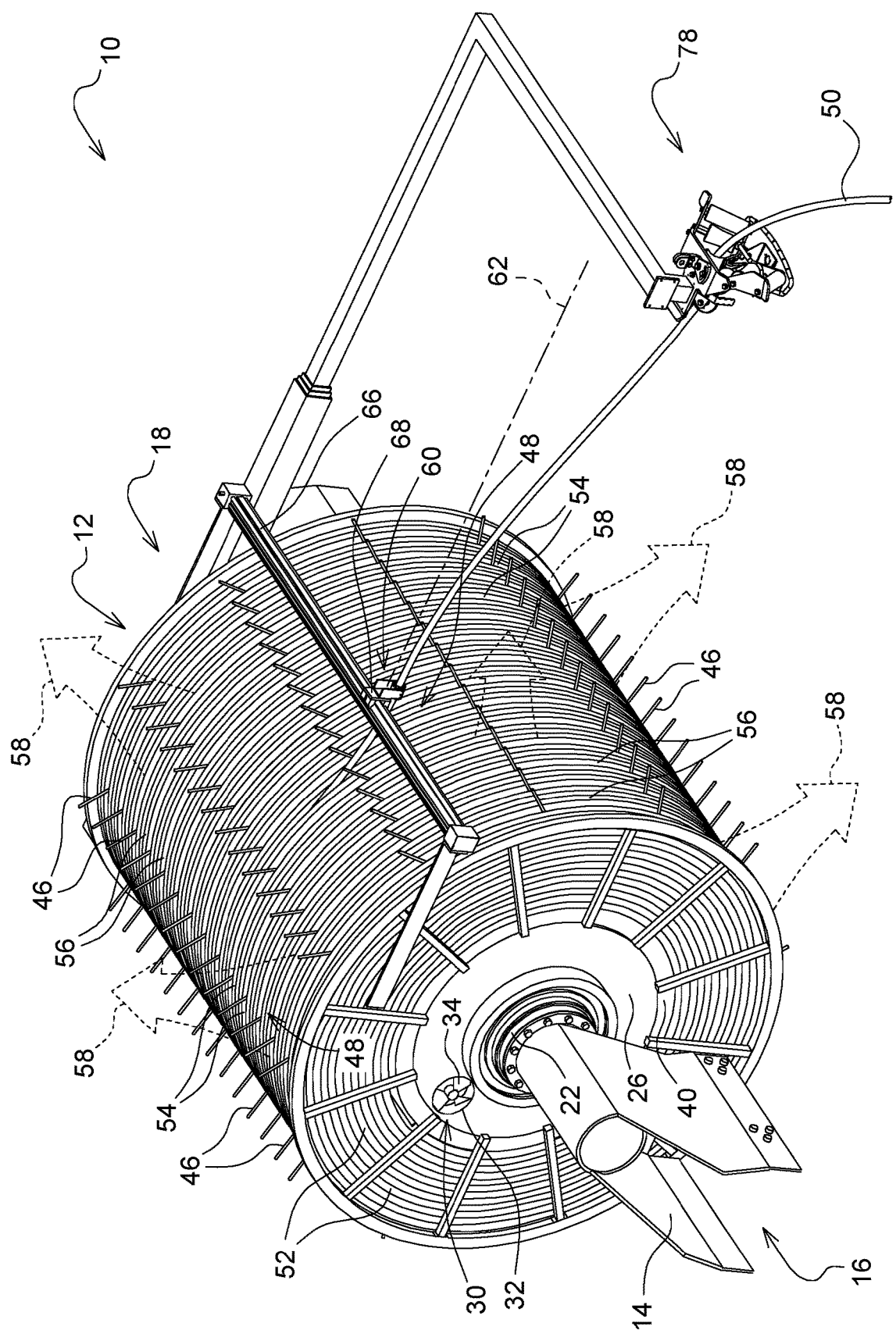
FIG. 2 is a schematic view of the cable drum of FIG. 1 in a wound state.

Spacing means 48, such as spacing rods 46, may be provided for serving to segment an electric line 50, or one or more winding layers 52 formed by the latter (for which, see FIG. 2). These are reeled-up onto the winding body 12 with the spacing rods 46 projecting radially on the winding body 12. The spacing rods 46 are uniformly spaced apart from each other axially, and arranged in rows along the axial course of the winding body 12. According to the present embodiment, the spacing rods 46 are attached to the axial struts 38 of the drum skeleton 36 in a radially flexible manner, for which purpose they are composed of elastic steel.

As can be seen from the representation of the cable drum 10 in a fully wound state in FIG. 2, the spacing rods 46 in each case keep clear a passage region 54 between adjacent segments 56 of the winding layers 52, such that cooling air generated by means of the air conveying means 30 can flow outward from the interior of the winding body 12. In the present case, there are line windings accommodated in each of the segments 56, such that the distance to the outer line windings exposed to the cooling air flow 58 is at most 2½ line widths in each case. In the case of a multiplicity of mutually superimposed winding layers 52, there is also adequate dissipation of heat out of the interior of the winding packets present in the segments 56. The representation of 5 line windings is intended in this case to be merely exemplary in character, and the segments 56 can just as well comprise a different number of line windings, typically in the range of from 1 to 6 line windings per segment 56.

In each of the passage regions 54, there is a total of 10 spacing rods 46 arranged in an evenly distributed manner along an outer circumference of the winding body 12. The diameter of the spacing rods 46 in this case defines the width of the passage region 54 kept free for the cooling air flow 58 on the winding body 12. The passage region is in the form of a circumferential annular gap, for which purpose the spacing rods 46 each lie in a common section plane of the winding body 12.

More precisely, the mutually superimposed line windings of the winding layer 52 limit the cooling air flow 58 to the passage regions kept free by means of the spacing rods 46, such that the back-pressure built up within the winding body 12 by means of the air conveying means 30 can substantially escape outward only via these regions.

If, instead of being a drum skeleton 36, the winding body 12 is a closed drum body, the latter comprises air outlet openings provided in the passage regions 54. In this case, the closed drum body has a drum-shaped wall composed of steel plate, in which the air outlet openings are made in the form of corresponding through-holes.

For the purpose of protecting the electric line 50, the spacing rods 46 additionally have rounded edges. The latter may also optionally be provided with a friction-reducing coating composed of plastic, thus ensuring that, within the respective segment 56, the individual line windings slide past along the spacing rods 46 in an improved manner during rolling-up and unrolling.

If, as here, there is an even number of spacing rods 46 provided in each of the passage regions 54, they may each be radially connected to each other in pairs in an end region, according to a design of the cable drum 10 that is not represented. In this case, each of the pairs has a u-shaped or v-shaped course of the spacing rods 46.

During reeling-up and unreeling, the electric line 50 is guided by means of a cable guide 60 in a predefined direction of incidence relative 62 to the winding body 12. The spacing rods 46 have an angle of inclination relative to the winding body 12 that corresponds to the predefined direction of incidence 62. It can thereby be ensured that, during rotation of the winding body 12, the spacing rods 46 run substantially parallel to each other in passing the region of the electric line 50.

The cable guide 60 can be displaced axially for the purpose of reeling-up and unreeling the electric line 50 in a reproducible manner by means of the positioning means 64. The positioning means 64 includes a lateral guide block 68 that is mounted inside the guide rail 66 and to which the actual cable guide 60 is fastened, the lateral guide block 68 being movable back and forth inside the guide rail 66 by means of an electric spindle drive 70. A control unit 72 controls the winding drive 20 in combination with the positioning means 64 in such a manner that, by coordination of the rotation of the winding body 12 with the axial displacement of the cable guide 60, the electric line 50 is reeled-up orthocyclically onto the winding body 12. For this purpose, there is a (e.g., incremental) rotary position transducer 74 assigned to the winding body 12 and a (e.g., linear) position sensor 76 assigned to the displaceable cable guide 60, the sensor information provided to that extent being supplied to the control unit 72 for evaluation and corresponding control of the winding drive 20 and to the positioning means 64. During reeling-up and unreeling of the electric line 50 within the segments 56, the orthocyclic winding pattern in this case provides an orthogonal jump, i.e., oriented transversely in relation to the winding direction, by an entire line width, or half a line width, and specifically in each case upon completion of a full or half rotation of the winding body 12. Upon changeover between the segments 56, this is dimensioned according to the diameter of the spacing rods 46 that is to be overcome. A further cable guide 78, rigidly attached to the supporting frame structure 14, serves in this case to feed the electric line 50 into the lateral guide block 68 in a defined direction.

The cable guide 60 has a sensor means 80 for sensing a lateral deviation of the electric line 50 from a winding direction to be maintained, the control unit 72, upon identification of an inadmissible lateral deviation, initiating a correcting movement of the cable guide 60 by controlling the positioning means 64 or partially reeling back the electric line 50 by controlling the electric winding drive 20 in order to remedy a mis-winding. An inadmissible deviation from the winding direction to be maintained exists if the lateral exit angle of the electric line 50 at the lateral guide block 68 deviates from the perpendicular to the winding body 12 by a predefined tolerance dimension. For the purpose of sensing the lateral exit angle, i.e., the angle assumed by the electric line 50 within the plane spanned by the rotary shaft 22 of the winding body 12, the sensor means 80 has a laser scanner, a light barrier or a camera, allowing contactless scanning of the electric line 50, or more precisely of the portion of line emerging at the lateral guide block 68 in the direction of the winding body 12. In variation, sensing is effected by means of a mechanical angle sensor, for which purpose the latter has a touch probe bearing against the electric line 50, in order to sense the course of the line.

In addition, the air conveying means 30 adapts the cooling air flow 58 in dependence on information in respect of the operating temperature of the electric line 50 present on the winding body 12. To that extent, closed-loop control of rotational speed is effected by the control unit 72, for which purpose the latter performs an estimation of the actual cooling or volumetric flow requirement. The estimation of the actual cooling or volumetric flow requirement is effected by the control unit 72 on a model basis, according to electrical and thermal properties of the electric line 50 used, such as the line resistivity, the thermal coefficient or the like, and also according to the wound state of the cable drum 10, obtained from the sensor information of the rotary position sensor 74, the ambient temperature sensed by means of a temperature sensor 82 additionally being included by the control unit 72.

Figure 3:
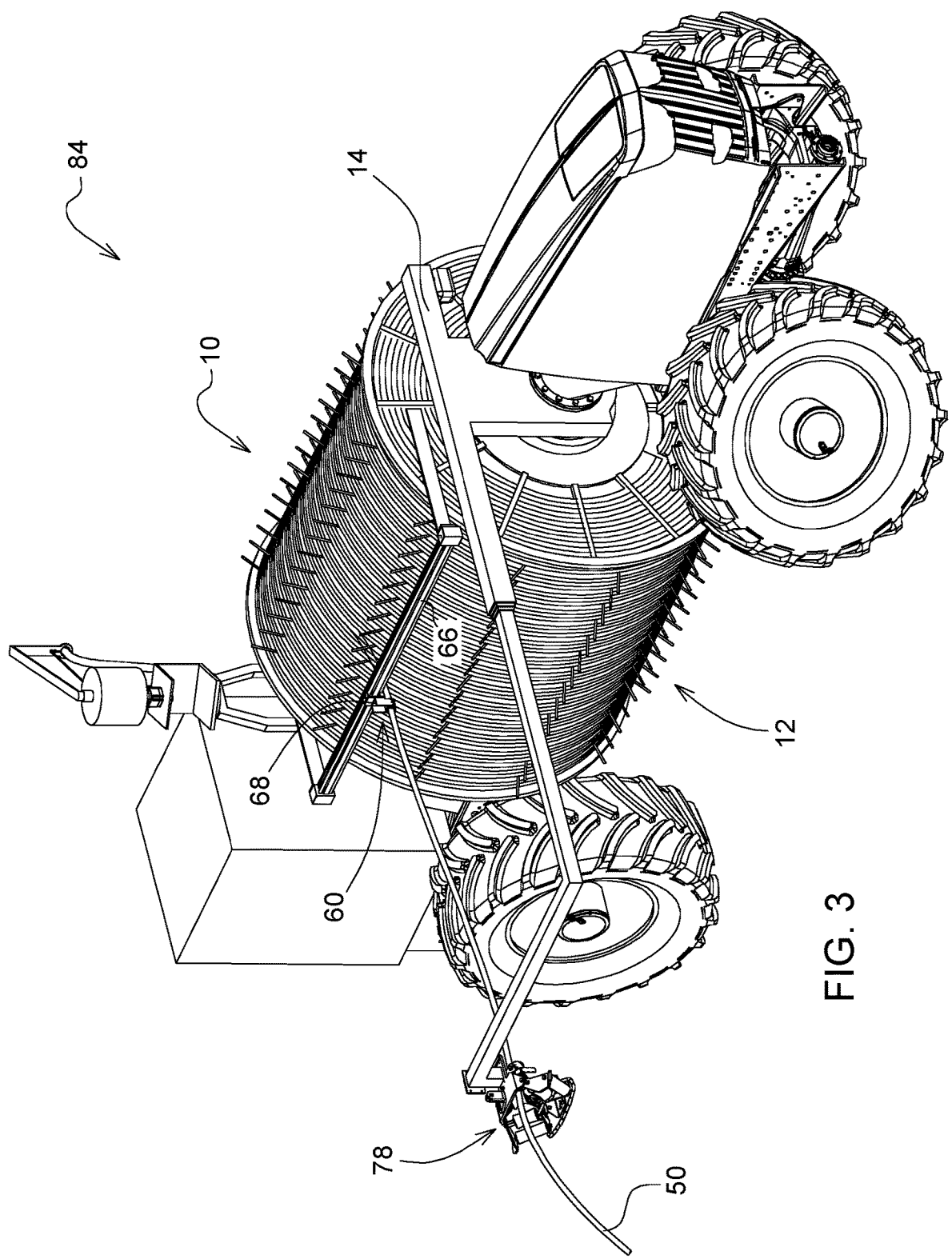
FIG. 3 is a schematic representation of an electrically operated agricultural tractor equipped with the cable drum of FIG. 1.

An application of the cable drum 10 presents itself, in particular, in connection with electrically operated utility vehicles, owing to the high power densities that are to be expected. Such a situation is illustrated in FIG. 3, in which the cable drum 10 is a constituent part of an autonomously driving agricultural tractor 84, the travel or work assemblies of which are driven by means of electric motors operating in the medium voltage range. The cable drum 10, or the winding body 12, is dimensioned in such a manner that an electric line 50 having a length of several kilometers can be accommodated thereon. The electric line 50 in this case, in addition to comprising cores for electric power supply, also comprises such for electrical or optical data transmission.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A cable drum for supplying energy to an electrically operated utility vehicle, comprising:
   an axially extending winding body;
   a winding drive for rotatably driving the winding body for reeling-up or unreeling an electric line;
   a spacing means for segmenting a winding layer reeled-up onto the winding body; and
   an air conveying means for generating cooling air through a passage region;
   wherein, the cooling air flows outward of the interior of the winding body;
   wherein, the passage region is kept clear between adjacent segments of the winding layer; and
   wherein a control unit effects the cooling air flow by closed-loop control of the rotational speed of the air conveying means via an estimation of a volumetric flow requirement based on an electrical property and a thermal property of the electric line, including a line resistivity and a thermal coefficient, a wound state of the cable drum obtained from a rotary position sensor, and an ambient temperature sensed by means of a temperature sensor.

2. The cable drum of claim 1, wherein the spacing means comprises spacing rods projecting radially on the winding body.

3. The cable drum of claim 2, wherein, in each of the passage regions, a plurality of spacing rods are arranged in an evenly distributed manner along an outer circumference of the winding body.

4. The cable drum of claim 2, wherein an even number of spacing rods is provided in each of the passage regions, where the spacing rods are connected to each other radially in pairs, in an end region in each case, to increase the stability.

5. The cable drum of claim 2, wherein the spacing rods are attached to the winding body in a radially flexible manner.

6. The cable drum of claim 2, wherein the spacing rods have rounded edges.

7. The cable drum of claim 2, wherein, during reeling-up and unreeling, the electric line is guided in a predefined direction of incidence relative to the winding body.

8. The cable drum of claim 7, wherein the spacing rods comprise an angle of inclination relative to the winding body that corresponds to the predefined direction of incidence.

9. The cable drum of claim 7, wherein the electric line is guided by means of a cable guide.

10. The cable drum of claim 1, wherein the winding body has first and second drum flanges at its axial end faces.

11. The cable drum of claim 10, wherein the winding body comprises an air supply opening which communicates with the air conveying means, the air supply opening being defined in at least one of the two drum flanges.

12. The cable drum of claim 1, wherein the winding body is formed either by a drum skeleton or a closed drum body having air outlet openings provided in the passage regions.

13. The cable drum of claim 1, wherein the cable drum comprises a cable guide being axially displaceable by means of a positioning means for reeling-up and unreeling the electric line.

14. The cable drum of claim 13, further comprising
   a control unit for controlling the winding drive in combination with the positioning means such that, by coordination of the rotation of the winding body with the axial displacement of the cable guide, the electric line is reeled-up orthocyclically onto the winding body.

15. The cable drum of claim 10, wherein:
   the cable guide comprises a sensor means for sensing a lateral deviation of the electric line from a winding direction to be maintained;
   the control unit, upon identification of an inadmissible lateral deviation of the electric line, is configured to initiate a correcting movement of the cable guide by controlling the positioning means for partially reeling back the electric line by controlling the electric winding drive in order to remedy a mis-winding.

16. The cable drum of claim 1, wherein the air conveying means adapts the cooling air flow in dependence on information in respect of the operating temperature of the electric line present on the winding body.

17. A cable drum for supplying energy to an electrically operated utility vehicle, comprising:
   an axially extending winding body;
   a winding drive for rotatably driving the winding body for reeling-up or unreeling an electric line;
   a spacing means for segmenting a winding layer reeled-up onto the winding body;
   an air conveying means for generating cooling air through a passage region; and
   a control unit for controlling the winding drive in combination with the positioning means such that, by coordination of the rotation of the winding body with the axial displacement of the cable guide, the electric line is reeled-up orthocyclically onto the winding body;

wherein, the cooling air flows outward of the interior of the winding body;

wherein, the passage region is kept clear between adjacent segments of the winding layer; and wherein the cable drum comprises a cable guide being axially displaceable by means of a positioning means for reeling-up and unreeling the electric line.

18. A cable drum for supplying energy to an electrically operated utility vehicle, comprising:

an axially extending winding body;

a winding drive for rotatably driving the winding body for reeling-up or unreeling an electric line;

a spacing means for segmenting a winding layer reeled-up onto the winding body; and an air conveying means for generating cooling air through a passage region;

wherein, the cooling air flows outward of the interior of the winding body;

wherein, the passage region is kept clear between adjacent segments of the winding layer;

wherein, the cable guide comprises a sensor means for sensing a lateral deviation of the electric line from a winding direction to be maintained; and wherein, the control unit, upon identification of an inadmissible lateral deviation of the electric line, is configured to initiate a correcting movement of the cable guide by controlling the positioning means or partially reeling back the electric line by controlling the electric winding drive in order to remedy a mis-winding.

19. The cable drum of claim 18, wherein the winding body has first and second drum flanges at its axial end faces.

* * * * *